United States Patent [19]

Gitman

[11] Patent Number: 4,797,087
[45] Date of Patent: Jan. 10, 1989

[54] METHOD AND APPARATUS FOR GENERATING HIGHLY LUMINOUS FLAME

[75] Inventor: Grigory M. Gitman, Duluth, Ga.

[73] Assignee: American Combustion, Inc., Norcross, Ga.

[21] Appl. No.: 883,769

[22] Filed: Jul. 9, 1986

Related U.S. Application Data

[63] Continuation-in-part of Ser. No. 755,831, Jul. 15, 1985, Pat. No. 4,642,047, which is a continuation-in-part of Ser. No. 642,141, Aug. 17, 1984, Pat. No. 4,622,007.

[51] Int. Cl.$^4$ .............................................. F23M 3/04
[52] U.S. Cl. ...................................... 431/10; 431/160; 431/187; 239/423
[58] Field of Search ...................... 431/8, 10, 181, 187, 431/284, 160; 239/418, 422, 423, 424, 428; 432/13

[56] References Cited

U.S. PATENT DOCUMENTS 3,729,285 4/1973 Schwedersky ............................ 431/8
4,095,929 6/1978 McCartney ....................... 431/284 X
4,541,796 9/1985 Anderson .............................. 431/187

FOREIGN PATENT DOCUMENTS 52-233 4/1977 Japan ..................................... 431/10

Primary Examiner—Margaret A. Focarino
Attorney, Agent, or Firm—Needle & Rosenberg

[57] ABSTRACT

A burner and method is disclosed in which a first oxidizing gas containing a high oxygen concentration is injected as a stream into the central zone of combustion tunnel, and part of the fuel is injected into said central pyrolysis zone to mix with said first oxidizing gas to create a highly luminous, high temperature flame core containing microparticles of carbon of the proper size for maximum luminosity and high temperature, and a relatively small amount of hydrocarbon radicals. In addition, the remaining part of the fuel is injected in a plurality of streams about said flame core to mix with a second oxidizing gas containing a lower oxygen concentration than the first oxidizing gas and injecting said second oxidizing mixture about said flame core and said remaining fuel flow to mix with said remaining fuel flow. This creates a plurality of fuel lean flames which are directed toward said luminous flame core to form a final flame pattern having high temperature, high luminosity and low $NO_x$ content.

32 Claims, 2 Drawing Sheets

METHOD AND APPARATUS FOR GENERATING HIGHLY LUMINOUS FLAME

This application is a continuation-in-part of application Ser. No. 755,831, filed July 15, 1985, U.S. Pat. No. 4,642,047, which is a continuation-in-part of application Ser. No. 642,141, filed Aug. 17, 1984, U.S. Pat. No. 4,622,007.

BACKGROUND OF THE INVENTION

This invention relates to methods and apparatus for generating highly luminous high temperature, low $NO_x$ flames using fluid fuels. The methods and apparatus disclosed may be used as the major source of energy and also as an assisting energy source in melting furnaces, industrial heating and heat treating furnaces, kilns, incinerators and other high temperature applications.

Industrial furnaces for high temperature heating (above 1800° F.) and melting applications commonly use gaseous fuels such as natural gas. When ambient air (especially preheated air) is used as the oxidizer the gaseous flames are normally blue with very low luminosity thus reducing the heat exchange between the flame and the furnace contents. By comparison, luminous oil flames result, in many cases, with as much as 25% less fuel consumption and a decrease in exhaust gas temperatures.

Utilization of oxygen to increase the heating efficiency due to higher flame temperature and the lower volume of flue gases is a well-known combustion approach. However, known methods of introduction of the oxygen into a combustion process through the injection of oxygen into the combustion air, commonly called oxygen enrichment, result in even further reduction of flame luminosity and an increase of $NO_x$ emissions due to oxidation of nitrogen with oxygen inside the higher temperature flame. The ratio control between fuel flow and enriched air flow is similar to standard fuel/air ratio control. The ratio of total air to total oxygen is normally constant during the heating cycle.

U.S. Pat. No. 3,729,285 to Schwedersky discloses a staged method of gaseous fuel combustion inside the burner tunnel wherein two fuel streams with associated air streams are separately controlled, delivered to the combustion chamber and burned prior to mixing the combustion products together to create a low $NO_x$ flame. In order to be able to accomplish stable pyrolysis with air, having approximately 78% $N_2$, inside the burner, the ratio of oxidizer to fuel would have to be at least 75% of stoichiometric to insure adequate heat release during the partial combustion of the fuel being pyrolyzed, since heat stored in the $N_2$ molecules in the pyrolysis zone will be unavailable for pyrolysis. This diluted flame core reduces flame temperature inside said core, and also has a relatively low air deficiency, eliminating the possibility of significant formation of carbon microparticles of the proper size required to provide adequate flame luminosity. Thus, this invention cannot practically utilize pyrolysis, since most fuel is used to create heat, leaving little fuel to be pyrolyzed.

Carbon microparticles required for maximum emissivity are in the size range of 0.05 to 4.0 microns and the formation of particles in this size range has been shown to be optimized at above 3000° F., which is a temperature that is not achievable without a high concentration of oxygen in the oxidizing gas. In the low temperature conditions of Schwedersky excessive hydrocarbon fuels will generate predominately more hydrocarbon radicals than particles of carbon capable of boosting flame luminosity. Also a low flame core temperature significantly reduces the radiative capability of said particles. The flame introduced by the Schwederskypatent has less $NO_x$ emissions than other flames, but it also has low radiative heat flux due to the low temperature of the flame envelope.

Because the ratio of total oxygen to total fuel is not variable in such systems, the volume of flue gases per Btu at standard conditions is fixed throughout the entire firing cycle. The temperature inside the refractory combustion chamber is slightly reduced due to staged combustion. The Schwedersky Patent also describes a burner utilizing more than one oxidizing stream to stage combustion, but does not have the ability to utilize pure oxygen, as is made clear by the fact that metal as used in the combustion chamber could not survive the temperature of a flame utilizing pure oxygen, nor does it disclose enrichment by or use of pure oxygen.

SUMMARY OF THE INVENTION

In accordance with the invention, the process is comprised of the initial control of fuel, oxygen and air flows, delivering the oxidizers to a burner as two oxidizing gases having different oxygen concentrations (for example, pure oxygen and air, or oxygen and oxygen enriched air). A first oxidizing gas containing a high oxygen concentration is injected as a stream into the central zone of a combustion tunnel (or combustion chamber), and part of the fuel (preferably the major part) is injected into said central pyrolysis zone to mix with said first oxidizing gas (preferably at ratios of fuel to oxygen between 0.8–2.5) to create a highly lumious, high temperature flame core containing microparticles of carbon of the proper size for maximum luminosity and high temperature, and a relatively small amount of hydrocarbon radicals. In addition, part of the fuel (preferably the minor part) is injected in a plurality of streams about said flame core to mix with a second oxidizing gas (containing a lower oxygen concentration than the first oxidizing gas) and injecting said second oxidizing mixture about said flame core and said minor fuel flow to mix with said minor fuel flow (preferably at fuel to oxygen ratio below 0.4). This creates a plurality of fuel lean (oxygen rich) flames which are directed toward said luminous flame core to form a final flame pattern having high temperature, high luminosity and low $NO_x$ content.

The utilization of a high oxygen concentration in the first oxidizing gas makes it possible to boost the temperature of carbon microparticles and the concentration of these particles (due to low flue gas volume), thus significantly increasing the radiative flux from the final flame toward the product being heated. Effective pyrolysis of natural gas must take place with the temperature of the entire pyrolytic zone being maintained in excess of 2400° F. Below this temperature, the methane tends to form benzols and other hydrocarbons rather than pure carbon particles. Radiation from pure carbon particles makes a significant contribution to the overall luminosity of the flame produced by the burner described herein. As previously mentioned, these particles must be in the size range of 0.05–4.0 microns for maximum radiation in the visible and infrared spectrum. This phenomena dominates at higher temperatures (above 3000° F.) such as are present in the burner described herein. This radiation is in addition to the radiation of hot $CO_2$ and $H_2O$ molecules from the combustion products, which is typical for hydrocarbon fuel flames. By generating additional heat in the space surrounding the pyrolytic zone, the fuel pyrolysis is intensified and the temperature of the microparticles of carbon is increased to create a higher radiation heat flux from the flame pattern.

The additional heat flux of the highly luminous flame results in reduction of the temperature of the products of combustion prior to their contact with the furnace load, which will reduce the oxidation of the load. Therefore, a larger portion of the heat released by combustion may be transferred to the load at a given process temperature due to the higher temperature and luminosity of the flame envelope being produced by the above described simultaneously occurring parallel stage combustion.

The low $NO_x$ produced by this combustion method is due to the very low nitrogen concentration of the first oxidizing gas (preferably pure oxygen) present inside the flame core where the high concentration of CO and hydrocarbons also prevents nitrogen oxidation. In addition, the plurality of fuel lean flames (diluted, for example, with excess of $O_2$ and $N_2$) surrounding said central flame core do not have a large enough flame pattern to raise the temperature inside their individual flame cores above 2700° F. and thus to trigger $NO_x$ formation. The structure of the final flame, having a high temperature central core with a very low concentration of nitrogen, prevents the $NO_x$ concentration from increasing through the final stage of combustion inside and outside the burner tunnel.

A single fuel source may supply the fuel for both the central fuel-rich and outer fuel-lean flames or mixtures. To mix the fuel with the first and second oxidizing gas streams, the fuel may be introduced through two separately directed nozzle sets, one part being directed to mix with the central flame core, and the other part to mix with the second oxidizing gas surrounding said central zone. The dimensions of the openings introducing the fuel streams and their directions determine their relative volume and the intensity of mixing with the oxidizer. The flame velocity, temperature, and combustion product volume may be varied, for example, at a given heat energy input level through the adjustment of the ratio between air and oxygen in the oxidizing gases, constantly keeping the two fuel flows at a fixed ratio.

Fuel (for example, natural gas) may also be supplied to the burner as two separate streams and in such case the flame characteristics may be varied by separate control of the fuel flows delivered to the burner by separate conduits. When such separation of fuel occurs two different fuels may be used for combustion simultaneously. As a example, liquid fuel may be used in central pyrolysis zone and coke oven gas or natural gas in minor fuel flow peripheral zone.

Where it its desirable to have a lower temperature flame for a particular application, the participation of oxygen should be lower than that required for complete pyrolysis of the fuel. In such cases, the pure oxygen supplied for participation in the combustion process is reduced, for example, to a ratio of pure oxygen/air below 0.2. At such conditions, where less oxygen is available for pyrolysis, the energy balance in the pyrolytic zone may become critical and to support adequate temperature conditions in the pyrolytic zone more fuel is directed to the fuel lean zone, thereby reducing the amount of fuel being pyrolyzed so as to increase the temperature in the pyrolytic zone as well as in the surrounding zone occupied by the fuel lean flames. Thus, the present invention may be used in a broad range of applications where a highly radiative flame is desirable.

The high radiation flux from the pyrolytic zone may raise the temperature inside the combustion chamber to a level where the exposed metal parts inside the combustion chamber will deteriorate. Therefore, liquid cooling of burner parts so exposed may be necessary in certain embodiments of the present invention.

The burner and method of combustion may also be used for incineration of fluid hazardous waste having high or low caloric value. In this case, liquid waste may be introduced instead of one of the fuel streams, preferably the central stream. Oxygen utilization in this case makes the flame pattern hotter and the oxidizing gas more oxygen concentrated, thus improving the thermal destruction efficiency of the flame pattern. Utilization of this approach for low caloric value fuels, such as landfill gas, has similar advantages.

Therefore, it is an object of this invention to provide a combustion process and apparatus for generating a variable high temperature, highly luminous flame with low $NO_x$ emission by burning gaseous and liquid materials with oxygen and air.

It is a further object of this invention to provide a method and apparatus for simultaneously occurring parallel staged combustion which may be controlled to more efficiently utilize fuel and oxygen in a heating process.

These and other objects and advantages will appear from the following descriptions with reference to the drawings.

DESCRIPTION OF THE PREFERRED EMBODIMENTS

The preferred embodiments are now described with reference to the drawings, in which like number indicate like parts throughout the views.

Figure 1:
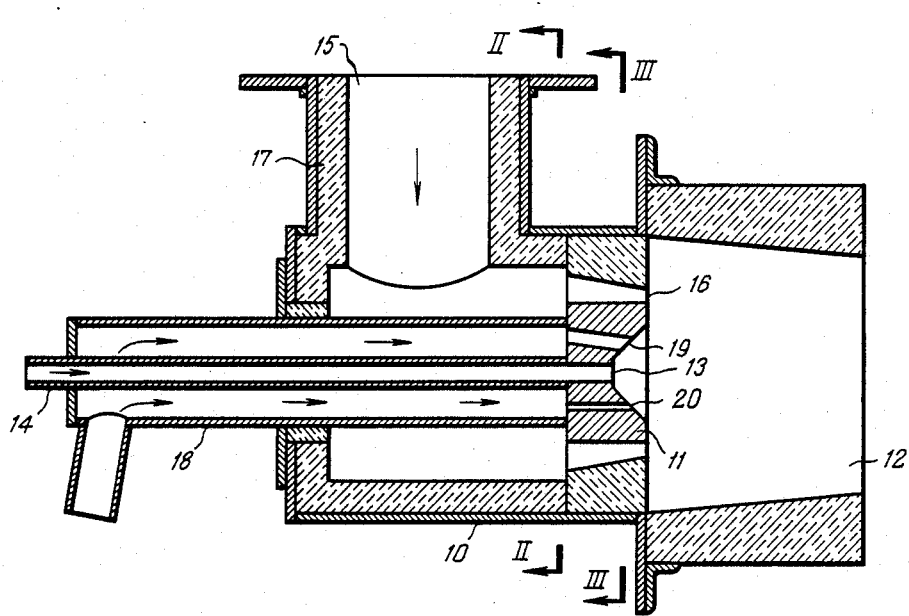
FIG. 1 is a side section view through the center of a burner of a first embodiment of the present invention.

FIG. 1 shows details of a preferred embodiment of the invention. The burner 10 comprises a nozzle assembly 11 which includes ports which direct streams of oxidizer gases and fuel into the combustion chamber 12 for combustion. The combustion chamber 12 in FIG. 1 may be within the wall of the furnace or other apparatus for industrial heating.

Specifically, a high oxygen concentration oxidizer is introduced through central port 13, along the center line of the combustion chamber 12. For instance, pure oxygen or an oxidizing gas containing a higher percentage of oxygen than in air is directed through central tube 14 to port 13. Air or an oxidizing gas having a lower oxygen concentration than the first oxidizer is introduced into the combustion chamber as a second oxidizer stream from air inlet 15 through air inlet port 16, of which there are eight in this embodiment. The air inlet ports 16 are directed about the central axis of the combustion chamber 12 to promote vigorous mixing of the second oxidizing gas with the fuel. Furthermore, the air inlet passages may include insulation 17 when a preheated second oxidizer gas is used.

Fluid fuel, such as natural gas, is introduced from fuel inlet tube 18 which is connected to the fuel ports 19 and 20. Fuel ports 19, of which there are four in this embodiment, are used to introduce streams of the major portion of the fuel toward the first oxidizer to provide vigorous mixing. The ports 20 for the minor fuel flow serve to direct the minor flow of the fuel toward the lower oxygen concentration second oxidizer streams from ports 16. The minor fuel ports 20 will have a smaller cross-section area than ports 19, such that the relative volumes of fuel directed to each oxidizer stream is automatically controlled. Preferably, the minor fuel ports 20 are parallel to the center line of the burner.

In this manner, two distinct flame regimes are established: a hot center core comprised of an oxidizer containing a high $O_2$ concentration and having a rich fuel-/oxidizer ratio, surrounded by a lean fuel/oxidizer mixture comprising an oxidizer containing a lower $O_2$ concentration mixed with said minor fuel flows.

Figures 2, 3:
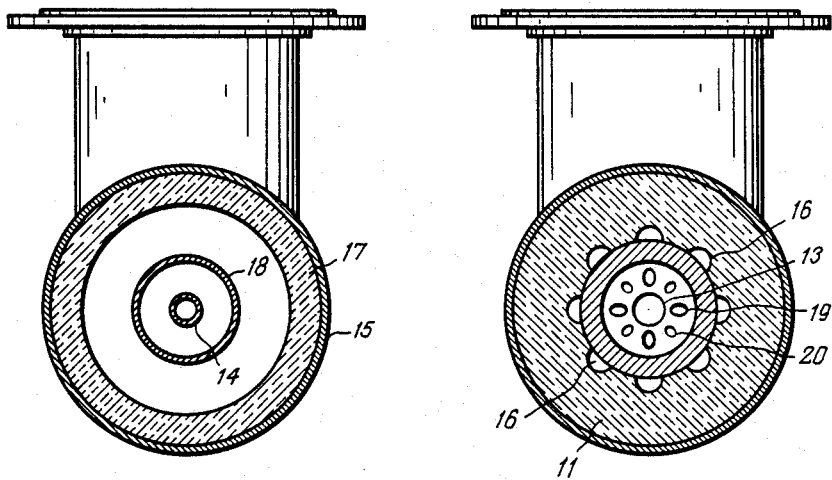
FIG. 2 is a section taken along line 2—2 of FIG. 1.
FIG. 3 is a section taken along line 3—3 of FIG. 1.

FIG. 2 is a cross-section through the various oxidizer and fuel inlet passages. The passages are concentric tubes, with inner inlet tube 14 being the high concentration oxidizer supply, middle tube 18 being the fuel supply, and outer tube 15 being the air supply, as discussed above.

FIG. 3 shows a cross-section through the burner face 11 showing the location and relative size of the various ports described above.

Figure 4:
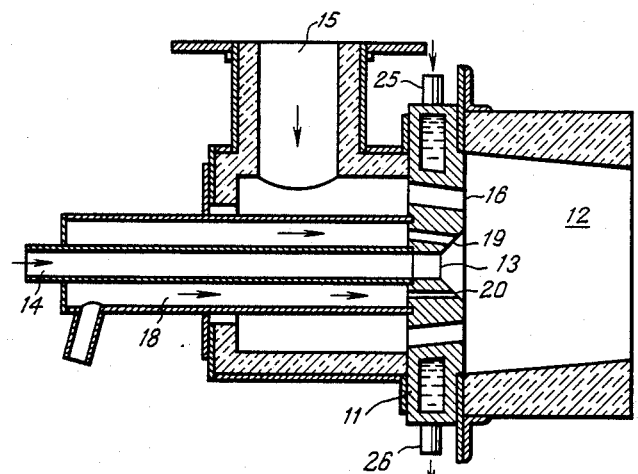
FIG. 4 is a side section view of the burner of a second embodiment of the present invention.

FIG. 4 shows an alternative embodiment of the burner face which includes water cooling. In high temperature applications where the flame temperature required is very high, or where the discharge of the products of combustion will be into a very high temperature process, water cooling of the burner assembly may be necessary. This is shown in FIG. 4 by a water cooling inlet 25 communicating with a water cooling outlet 26. Proper circulation of the water is arranged by appropriate baffles within the nozzle assembly 11.

Figure 5:
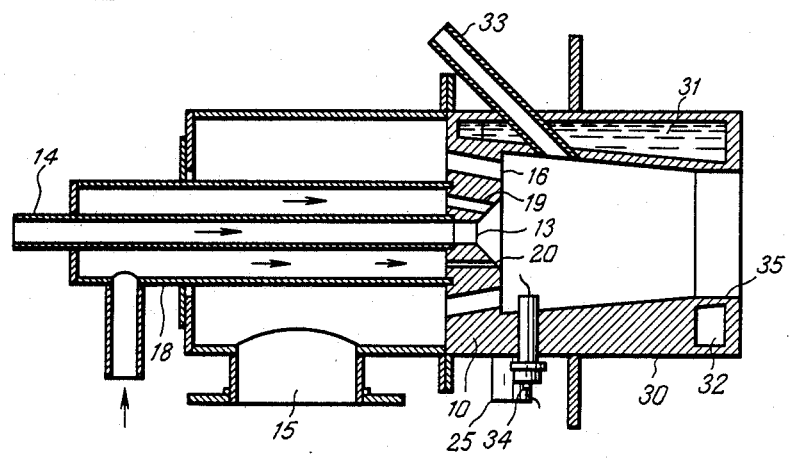
FIG. 5 is a side section view through the center of a burner of a third embodiment of the present invention.

In FIG. 5 an embodiment of the burner includes a full water cooled combustion tunnel 30, appropriate when an extremely hot high velocity flame is created within the combustion chamber or when the furnace on which the unit is installed can transfer a significant amount of heat back to the burner. Additional features of this embodiment shown in this figure are the water jacket 31 of the combustion tunnel 30, the cooling baffle bypass hole 32, a flame detector channel 33, and a spark plug 34 for ignition. The water cooled nozzle 35 is provided to choke the hot flame generated by the burner to create high velocity. Otherwise the burner is similar to the other configurations previously described.

Figure 6:
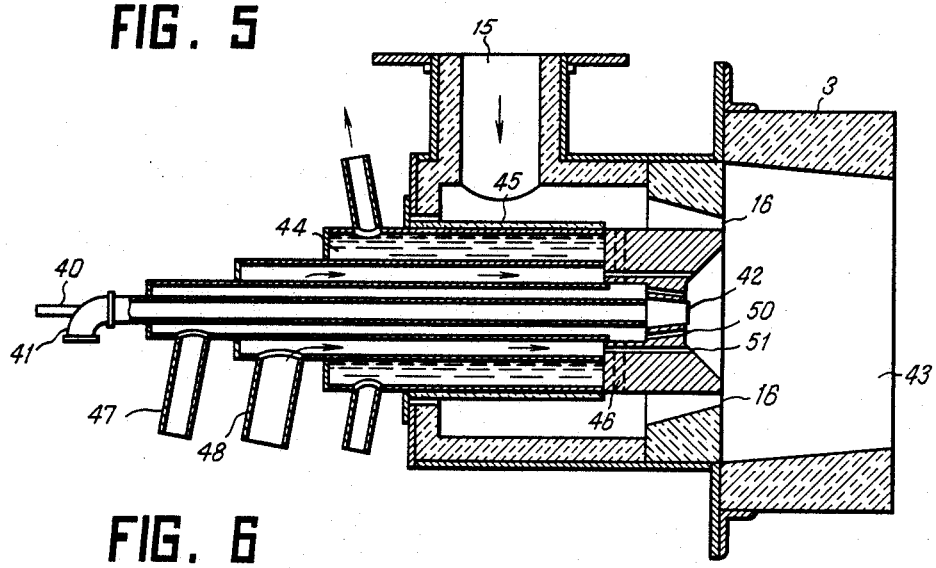
FIG. 6 is a side section view through the center of a burner of a fourth embodiment of the present invention.

In FIG. 6, an embodiment of a dual fuel burner design using air preheat is shown. This variation provides the ability to fire fuel oil or other liquids. For instance, oil is introduced through the tube 40, while atomizing gas enters through another tube 41. The oil and atomizing gas flow through the atomizing nozzle 42, which is cooled by contact with the heat conducting burner plate 43, which is in turn cooled by contact with cooling water jacket 44. The conically shaped oil nozzle 42 and attached tubes 40 and 41, can be removed from the rear of the burner for service and inspection. Oxygen enters through ports 50 which are directed towards the center line of the burner. The oxygen is provided to ports 50 through inlet tube 47. Gas, or other fuel, in introduced in inlet 48 to fuel ports 51 which are parallel to the center line of the burner and further away from the center line than oxygen ports 50. Air, which may be preheated, is introduced in inlet 15 and into the burner through ports 16, which direct the air towards the gas within the combustion chamber to form the outer flame cores. Insulation 45 may be provided around the center section of burner to prevent heat loss from preheated air due to contact with the cooling water jacket. An internal bleeding path 46 is provided between inlet tube 47 and inlet 15 for directing some of the pure oxygen into the heated air for oxygen enrichment of the air.

While this invention has been described in detail with particular reference to the preferred embodiments thereof, it will be understood that variations and modifications can be effected within the spirit and scope of the invention as previously described and defined in the claims.

What is claimed is:

1. A method of combusting combustible material in a burner having a combustion tunnel with an outlet opening to generate a high temperature, high luminosity flame, comprising the steps of:
   separately supplying combustible material, a first oxidizing gas having a given oxygen concentration, and a second oxidizing gas having a different oxygen concentration from said first oxidizing gas to the burner;
   separately directing said first oxidizing gas and a first portion of said combustible material into said combustion tunnel such that said portion of said combustible material and said first oxidizing gas mix at least partially within said combustion tunnel to create a hot oxygen lean luminous flame core;
   separately directing the remainder of said combustible material and said second oxidizing gas into said combustion tunnel such that said remainder of said combustible material and said second oxidizing gas mix at least partially within said combustion tunnel to create at least one oxygen rich mixture stream; and
   mixing said oxygen lean flame core with said at least one oxygen rich mixture stream to create a final highly luminous flame pattern extending out of said combustion tunnel.

2. The method of claim 1, wherein a multiplicity of said oxygen rich mixture streams surround said flame core.

3. The method of claim 1, wherein said at least one oxygen rich mixture stream is a flame.

4. The method of claim 1, wherein the oxygen concentration of said first oxidizing gas is higher than the oxygen concentration of said second oxidizing gas.

5. The method of claim 4, wherein said first oxidizer is pure oxygen.

6. The method of claim 4, wherein said second oxidizer is air.

7. The method of claim 1, wherein said first oxidizing gas is directed along the center line of said combustion tunnel and said first portion of combustible material is directed about and toward said first oxidizing gas.

8. The method of claim 4, which further comprises the step of enriching said second oxidizing gas with said first oxidizing gas prior to combustion by bleeding a portion of said first oxidizing gas into said second oxidizing gas.

9. The method of claim 1, which further comprises the step of cooling a portion of the combustion tunnel with a liquid.

10. The method of claim 1, wherein said first oxidizing gas has a higher oxygen concentration than said second oxidizing gas.

11. The method of claim 1, wherein said first oxidizer has an oxygen concentration sufficient to cause the flame core temperature to exceed 2400° F.

12. A burner for combustion of combustible material to generate a high temperature, high luminosity flame which comprises:
   a combustion tunnel having an outlet opening;
   means for separately supplying combustible material, a first oxidizing gas having a given oxygen concentration, and a second oxidizing gas having a different oxygen concentration from said first oxidizing gas to the burner;
   first means for separately directing said first oxidizing gas and a first portion of said combustible material into said combustion tunnel such that said portion of combustible material and said first oxidizing gas mix at least partially within said combustion tunnel to create a flame core;
   second means for separately directing the remainder of said combustible material and said second oxidizing gas into said combustion tunnel such that said remainer of combustible material and said second oxidizing gas mix together at least partially prior to mixing with said flame core; and
   means for causing said mixture of combustible material and said second oxidizing gas to subsequently mix with said flame core to create the final flame pattern.

13. The burner of claim 12, wherein said first directing means directs said first oxidizing gas in a central stream with said first portion of combustible material directed about said first oxidizing gas.

14. The burner of claim 13, wherein said second directing means directs the mixture of said second oxidizing gas and second portion of combustible material to surround the central flame core formed by combustion of said first oxidizing gas with said first portion of combustible material.

15. The burner of claim 12, wherein said combustion tunnel comprises a liquid cooled nozzle at its outlet opening.

16. The burner of claim 12, wherein the portion of said first and second directing means adjacent to said combustion tunnel is liquid cooled.

17. The burner of claim 12, wherein said combustion tunnel is liquid cooled along its length.

18. The burner of claim 12, further comprising means for injecting a portion of said first oxidizing gas into said second oxidizing gas internal to said burner prior to directing said first and second oxidizing gases into said combustion tunnel.

19. The burner of claim 2, wherein said first and second directing means comprise ports through the end of said combustion tunnel opposite the outlet opening for communicating with said combustible material or oxidizer supply means.

20. The burner of claim 19, wherein said ports communicating with said comnbustible material supply means have varying cross-sectional areas which determine the proportion of combustible material directed toward said first oxidizing gas and said second oxidizing gas within said combustion tunnel.

21. The burner of claim 12, wherein said first oxidizing gas has a higher oxygen concentration than said second oxidizing gas.

22. The burner of claim 12, wherein said first oxidizer has an oxygen concentration sufficient to cause the flame core temperature to exceed 2400° F.

23. The method of claim 15, wherein said first oxidizer has an oxygen concentration sufficient to cause the flame core temperature to exceed 2400° F.

24. A method of combusting combustible material in a burner having a combustion tunnel with an outlet opening to generate a high temperature, high luminosity flame, comprising the steps of:
   separately supplying a first and second combustible material, a first oxidizing gas having a given oxygen concentration, and a second oxidizing gas having a different oxygen concentration from said first oxidizing gas to the burner;
   separately directing said first oxidizing gas and said first combustible material into said combustion tunnel such that said first combustible material and said first oxidizing gas mix at least partially within said combustion tunnel to create a hot oxygen lean luminous flame core;
   separately directing said second combustible material and said second oxidizing gas into said combustion tunnel such that said second combustible material and said second oxidizing gas mix at least partially within said combustion tunnel to create at least one oxygen rich mixture stream; and
   mixing said oxygen lean flame core with said at least one oxygen rich mixture stream to create a final highly luminous flame pattern extending out of said combustion tunnel.

25. The method of claim 24, wherein a multiplicity of said oxygen rich mixture streams surround said flame core.

26. The method of claim 24, wherein said first combustible material is directed along the center line of said combustion tunnel and said first oxidizing gas is directed about and toward said first combustible material.

27. The method of claim 24, wherein said one of said combustible materials is gaseous and the other is liquid.

28. The method of claim 24, wherein said first oxidizing gas has a higher oxygen concentration than said second oxidizing gas.

29. A burner for combustion of combustible material to generate a high temperature, high luminosity flame which comprises:
   a combustion tunnel having an outlet opening;
   means for separately supplying a first and second combustible material, a first oxidizing gas having a given oxygen concentration, and a second oxidizing gas having a different oxygen concentration from said first oxidizing gas to the burner;
   first means for separately directing said first oxidizing gas and said first combustible material into said combustion tunnel such that said first combustible material and said first oxidizing gas mix at least partially within said combustion tunnel to create a flame core;
   second means for separately directing said second combustible material and said second oxidizing gas into said combustion tunnel toward said outlet opening such that said second combustible material and said second oxidizing gas mix at least partially together prior to mixing with said flame core; and means for causing said mixture of said second combustible material and said second oxidizing gas to subsequently mix with said flame core to create the final flame pattern.

30. The burner of claim 29, wherein said first directing means directs said first combustible material in a central stream with said first oxidizing gas directed about said first combustible material.

31. The burner of claim 29, wherein said first oxidizing gas has a higher oxygen concentration than said second oxidizing gas.

32. The burner of claim 29, wherein said first oxidizer has an oxygen concentration sufficient to cause the flame core temperature to exceed 2400° F.

* * * * *

UNITED STATES PATENT AND TRADEMARK OFFICE
CERTIFICATE OF CORRECTION

PATENT NO. : 4,797,087

DATED : Jan. 10, 1989

INVENTOR(S) : Grigory M. Gitman

It is certified that error appears in the above-identified patent and that said Letters Patent is hereby corrected as shown below:

Column 7, line 58, Claim 19 should be dependent upon Claim 12 and not Claim 2.

Column 8, line 7, Claim 23 should be dependent upon Claim 24 and not 15.

Signed and Sealed this

Tenth Day of July, 1990

Attest:

HARRY F. MANBECK, JR.

*Attesting Officer*  *Commissioner of Patents and Trademarks*